United States Patent
Lindoff et al.

(10) Patent No.: US 10,405,345 B2
(45) Date of Patent: Sep. 3, 2019

(54) CONFIGURATION OF CELLULAR NETWORK NODES

(71) Applicant: Telefonaktiebolaget LM Ericsson (publ), Stockholm (SE)

(72) Inventors: Bengt Lindoff, Bjarred (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 15/106,294

(22) PCT Filed: Dec. 19, 2013

(86) PCT No.: PCT/EP2013/077388
§ 371 (c)(1),
(2) Date: Jun. 18, 2016

(87) PCT Pub. No.: WO2015/090406
PCT Pub. Date: Jun. 25, 2015

(65) Prior Publication Data
US 2016/0337176 A1 Nov. 17, 2016

(51) Int. Cl.
*H04W 74/08* (2009.01)
*H04W 16/14* (2009.01)
(Continued)

(52) U.S. Cl.
CPC ....... *H04W 74/0808* (2013.01); *H04L 5/0048* (2013.01); *H04L 41/0803* (2013.01);
(Continued)

(58) Field of Classification Search
CPC .................................. H04W 74/0808
See application file for complete search history.

(56) References Cited

U.S. PATENT DOCUMENTS 8,374,212 B2  2/2013  Charbit et al.
9,288,742 B2 *  3/2016  Etemad ................ H04W 16/14
(Continued)

FOREIGN PATENT DOCUMENTS

WO  2009031825 A2  3/2009
WO  2012026857 A1  3/2012
(Continued)

OTHER PUBLICATIONS

Ian F. Akylidiz et al., A Survey on Spectrum Management in Cognitive Radio Networks, Cognitive Radio Communications and Networks, IEEE Communications Magazine, Apr. 2008, pp. 40-48.
(Continued)

*Primary Examiner* — Jason E Mattis
(74) *Attorney, Agent, or Firm* — Sage Patent Group (57) ABSTRACT

There is provided configuration of a secondary cellular network node for a secondary serving cell associated with a primary serving cell in a carrier aggregation enabled communications network. The secondary cellular network node receives an indication from a primary cellular network node associated with the primary serving cell to start scanning an unlicensed frequency band for deployment of the secondary serving cell. The secondary cellular network node scans at least one unlicensed frequency band to determine whether or not interference from transmitting interferers is present in the at least one unlicensed frequency band. The secondary cellular network node determines, based on the scanning, at least one frequency interval of the at least one unlicensed frequency band substantially free from the transmitting interferers. The secondary cellular network node transmits first configuration information of the at least one frequency interval to the primary cellular network node. The secondary cellular network node deploys the secondary serving cell by configuring the secondary cellular network node for trans-
(Continued)

mission in one of the at least one frequency interval according to second configuration information being based on the first configuration information.

19 Claims, 6 Drawing Sheets

(51) Int. Cl.
*H04W 24/02* (2009.01)
*H04L 5/00* (2006.01)
*H04L 12/24* (2006.01)
*H04W 56/00* (2009.01)
*H04W 72/04* (2009.01)

(52) U.S. Cl.
CPC ............ *H04L 41/12* (2013.01); *H04W 16/14* (2013.01); *H04W 24/02* (2013.01); *H04W 56/001* (2013.01); *H04W 72/0453* (2013.01); *H04W 74/0816* (2013.01)

(56) References Cited

U.S. PATENT DOCUMENTS

| 9,788,320 B2* | 10/2017 | Cattoni | H04L 5/0044 |
|---|---|---|---|
| 2012/0250578 A1* | 10/2012 | Pani | H04W 48/12 |
| | | | 370/254 |
| 2012/0282942 A1* | 11/2012 | Uusitalo | H04W 16/14 |
| | | | 455/452.2 |
| 2013/0077554 A1 | 3/2013 | Gauvreau et al. | |
| 2013/0279376 A1* | 10/2013 | Ahmadi | H04W 72/04 |
| | | | 370/277 |
| 2014/0043979 A1 | 2/2014 | Etemad et al. | |
| 2014/0044105 A1* | 2/2014 | Bontu | H04L 5/001 |
| | | | 370/336 |
| 2015/0126207 A1 | 5/2015 | Li et al. | |
| 2015/0131536 A1 | 5/2015 | Kaur et al. | |
| 2015/0156635 A1* | 6/2015 | Liang | H04W 16/14 |
| | | | 370/328 |
| 2016/0301504 A1* | 10/2016 | Toskala | H04W 48/16 |
| 2016/0337177 A1 | 11/2016 | Lindoff et al. | |

FOREIGN PATENT DOCUMENTS

| WO | 2012051157 A1 | 4/2012 |
|---|---|---|
| WO | 2012134567 A1 | 10/2012 |
| WO | 2012152298 A1 | 11/2012 |
| WO | 2013001333 A1 | 1/2013 |
| WO | 2013179095 A1 | 12/2013 |

OTHER PUBLICATIONS

Beibei Wang et al., Advances in Cognitive Radio Networks: A Survey, IEEE Journal of Selected Topics in Signal Processing, vol. 5, No. 1, Feb. 2011, pp. 5-23.
PCT International Search Report, dated Oct. 16, 2014, in connection with International Application No. PCT/EP2013/077388, all pages.
PCT Written Opinion, dated Oct. 16, 2014, in connection with International Application No. PCT/EP2013/077388, all pages.
PCT International Search Report and Written Opinion, dated Oct. 16, 2014, in connection with International Application No. PCT/EP2013/077376, 13 pages.
PCT International Preliminary Report on Patentability, dated Jun. 21, 2016, in connection with International Application No. PCT/EP2013/077376, 9 pages.

* cited by examiner

CONFIGURATION OF CELLULAR NETWORK NODES

TECHNICAL FIELD

Embodiments presented herein relate to configuration of a cellular network node, and particularly to methods, a secondary cellular network node, a primary cellular network node, computer programs, and a computer program product for configuration of a secondary cellular network node.

BACKGROUND

In communication networks, there is always a challenge to obtain good performance and capacity for a given communications protocol, its parameters and the physical environment in which the communication network is deployed.

In wireless communications networks there is currently a lot of available spectra in unlicensed frequency bands. These bands are currently widely used by Wi-Fi. The sharing of the spectrum in Wi-Fi is done by dividing the total bandwidth into a number of channels. In the 2.4 GHz frequency band the channels are typically around 20 MHz wide, and up to 13 channels are defined. These channels are partially overlapping, and thus will interfere with each other. Three non-overlapping channels may be used in the 2.4 GHz band. For the 5 GHz frequency band more channels are available as the available bandwidth is larger. With the development of IEEE 802.11n and IEEE 802.11ac, the bandwidth has been increased from 20 MHz to 40, 80, and even 160 MHz. Thus, in particular when wider bandwidths are used, the number of non-overlapping channels is still rather small.

In common deployments of Wi-Fi, the access points (APs) are allocated such that the used channels, as far as possible, are not overlapping. In practical deployments this may involve the distance between APs using the same channel to be maximized.

Carrier sense multiple access with collision avoidance (CSMA/CA) is used for channel access. In general terms, this means that the channel is sensed, and only if the channel is declared as Idle, a transmission is initiated. In case the channel is declared as Busy, the transmission is deferred until the channel is found Idle. When the coverage areas of several APs overlap, this means that transmission related to one AP might be deferred in case a transmission to another AP which is within range can be detected. Effectively this means that if several APs are within range, they will have to share the channel in time, and the throughput for the individual APs may be severely degraded.

The main principle behind so-called cognitive radio is that an un-licensed user may be able to use licensed spectrum in case no licensed user (i.e., a white space; in telecommunications, white spaces generally refer to frequencies allocated to a broadcasting service but not used locally) is operating at a certain area. In general terms, the unlicensed user senses a certain spectrum and if no licensed user is presently transmitting the unlicensed user is allowed to use that spectrum for communication. The sensing typically has to continue during the communication since if any licensed user start to use the spectrum the unlicensed users typically need to terminate the communication. Hence cognitive radio application may have time-varying connections in the sense that different spectrum parts are used at different time.

The principles of sensing a spectrum and allocate a spectrum part to an unlicensed user when the spectrum is not used is known in the art. However, one issue concerns the fact that no considerations are made with respect to the fact that cellular communication networks, such as 3GPP (Third Generation Partnership) Long Term Evolution (LTE), have a variable bandwidth for determination of how much bandwidth one can allocate.

Cellular radio access technologies, such as 3GPP LTE communications may thus be used in unlicensed frequency bands, such as the industrial, scientific and medical (ISM) band. One approach is to use LTE on a best effort basis, when carrier aggregation is employed. Specifically, the unlicensed band is used for a secondary cell (SCell) to a Primary cell (PCell) that is operating in a licensed spectrum. In this way the connection to a served device may still be maintained via at least the PCell in case the SCell may be interfered by, say by Wi-Fi or Bluetooth.

Carrier aggregation is known in the art and is defined from 3GPP Release 10. However, the prior art does neither address allocation approaches, nor possible interference scenarios (e.g., how to handle transmissions from Wi-Fi, or Bluetooth transmitters) that may occur once LTE is deployed in an unlicensed frequency band. Further, in case the ISM band is to be shared between, for instance, Wi-Fi and LTE, it may be beneficial that LTE does not impact the performance of Wi-Fi. Because Wi-Fi is based on CSMA/CA, an LTE signal may effectively force a Wi-Fi transmitter to defer its transmission as long as the LTE signal is present. Thus, the performance for Wi-Fi may be severely degraded.

Therefore, there is a need for a flexible channel allocation for allocating LTE in unlicensed frequency bands.

Hence, there is still a need for an improved channel allocation in unlicensed frequency bands.

SUMMARY

An object of embodiments herein is to provide improved channel allocation in unlicensed frequency bands.

The inventors of the enclosed embodiments have realized that it may be desirable to use unlicensed frequency bands, for instance the ISM band at 2.4 GHz and the bands at 5 GHz for cellular radio access technologies, such as 3GPP (Third Generation Partnership) Long Term Evolution (LTE) communications. The inventors of the enclosed embodiments have further realized that since these unlicensed frequency bands currently are occupied by transmissions of other radio transmitters using radio access technologies such as Wi-Fi, it is desirable that the cellular radio access technologies, if introduced in these unlicensed frequency bands should not degrade the performance of these other radio transmitters, or at least the impact on these other radio transmitters should be as small as possible.

A particular object is therefore to provide improved channel allocation in unlicensed frequency bands which keeps the impact on other radio transmitters as small as possible.

According to a first aspect there is presented a method for configuration of a secondary cellular network node for a secondary serving cell associated with a primary serving cell in a carrier aggregation enabled communications network. The method is performed by the secondary cellular network node. The method comprises receiving an indication from a primary cellular network node associated with the primary serving cell to start scanning an unlicensed frequency band for deployment of the secondary serving cell. The method comprises scanning at least one unlicensed frequency band to determine whether or not interference from transmitting interferers is present in the at least one unlicensed frequency band. The method comprises determining, based on the scanning, at least one frequency interval of the at least one unlicensed frequency band substantially free from the transmitting interferers. The method comprises transmitting first configuration information of the at least one frequency interval to the primary cellular network node. The method comprises deploying the secondary serving cell by configuring the secondary cellular network node for transmission in one of the at least one frequency interval according to second configuration information being based on the first configuration information.

Advantageously this provides improved channel allocation in unlicensed frequency bands.

Advantageously this provides improved channel allocation in unlicensed frequency bands whilst keeping the impact on other radio transmitters as small as possible.

Advantageously this provides a means for a first RAT, for instance an LTE SCell (in conjunction with an LTE PCell in a licensed spectrum), to coexist with one or more RATs of other radio transmitters in an unlicensed frequency band without degrading the performance for the other RATs. This is advantageously done by selecting the proper bandwidth for the LTE SCell.

According to a second aspect there is presented a secondary cellular network node for configuration of the secondary cellular network node for a secondary serving cell associated with a primary serving cell in a carrier aggregation enabled communications network. The secondary cellular network node comprises a processing unit. The processing unit is arranged to receive an indication from a primary cellular network node associated with the primary serving cell to start scanning an unlicensed frequency band for deployment of the secondary serving cell. The processing unit is arranged to scan at least one unlicensed frequency band to determine whether or not interference from transmitting interferers is present in the at least one unlicensed frequency band. The processing unit is arranged to determine, based on the scanning, at least one frequency interval of the at least one unlicensed frequency band substantially free from the transmitting interferers. The processing unit is arranged to transmit first configuration information of the at least one frequency interval to the primary cellular network node. The processing unit is arranged to deploy the secondary serving cell by configuring the secondary cellular network node for transmission in one of the at least one frequency interval according to second configuration information being based on the first configuration information.

According to a third aspect there is presented a computer program for configuration of a secondary cellular network node, the computer program comprising computer program code which, when run on a secondary cellular network node, causes the secondary cellular network node to perform a method according to the first aspect.

According to a fourth aspect there is presented a method for configuration of a secondary cellular network node for a secondary serving cell associated with a primary serving cell in a carrier aggregation enabled communications network. The method is performed by a primary cellular network node associated with the primary serving cell. The method comprises determining a need for configuration of the secondary cellular network node for the secondary serving cell in an unlicensed frequency band. The method comprises transmitting an indication for the secondary cellular network node to start scanning the unlicensed frequency band for deployment of the secondary serving cell. The method comprises receiving, from the secondary cellular network node, first configuration information of at least one frequency interval of the at least one unlicensed frequency band substantially free from transmitting interferers. The method comprises determining, based on the received first configuration information, second configuration information for configuring the secondary cellular network node for transmission in one of the at least one frequency interval. The method comprises transmitting the second configuration information to the secondary cellular network node.

According to a fifth aspect there is presented a primary cellular network node for configuration of a secondary cellular network node for a secondary serving cell associated with a primary serving cell in a carrier aggregation enabled communications network. The primary cellular network node is arranged to be associated with the primary serving cell. The primary cellular network node comprises a processing unit. The processing unit is arranged to determine a need for configuration of the secondary cellular network node for the secondary serving cell in an unlicensed frequency band. The processing unit is arranged to transmit an indication for the secondary cellular network node to start scanning the unlicensed frequency band for deployment of the secondary serving cell. The processing unit is arranged to receive, from the secondary cellular network node, first configuration information of at least one frequency interval of the at least one unlicensed frequency band substantially free from transmitting interferers. The processing unit is arranged to determine, based on the received first configuration information, second configuration information for configuring the secondary cellular network node for transmission in one of the at least one frequency interval. The processing unit is arranged to transmit the second configuration information to the secondary cellular network node.

According to a sixth aspect there is presented a computer program for configuration of a secondary cellular network node, the computer program comprising computer program code which, when run on a primary cellular network node, causes the primary cellular network node to perform a method according to the fourth aspect.

According to a seventh aspect there is presented a computer program product comprising a computer program according to at least one of the first aspect and the fourth aspect and a computer readable means on which the computer program is stored.

According to an eight aspect there is presented an arrangement comprising a secondary cellular network node according to the second aspect and a primary cellular network node according to the fifth aspect. The secondary cellular network node may be a part of the primary cellular network node.

It is to be noted that any feature of the first, second, third, fourth, fifth, sixth, seventh and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
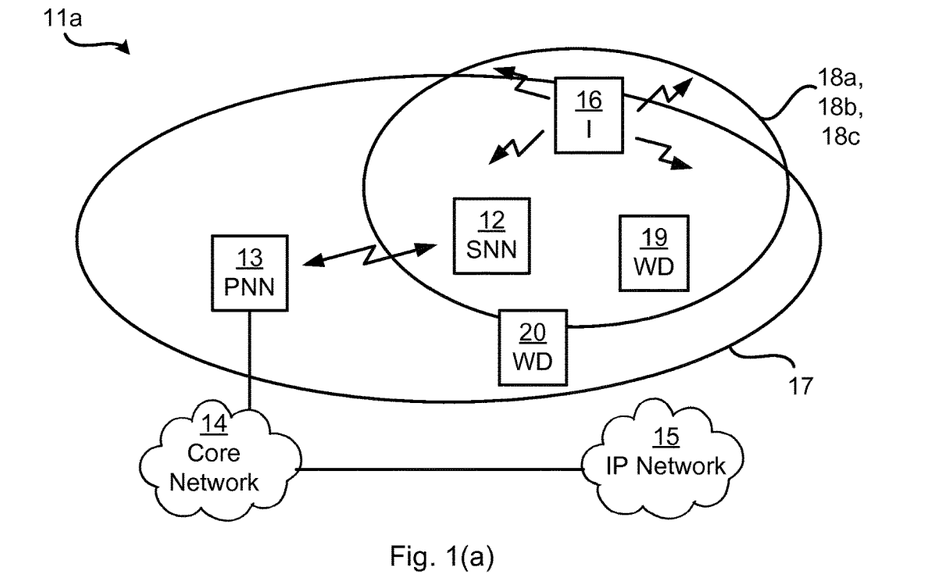
FIGS. 1a and 1b are schematic diagrams illustrating communication networks according to embodiments.
Figure 1B:
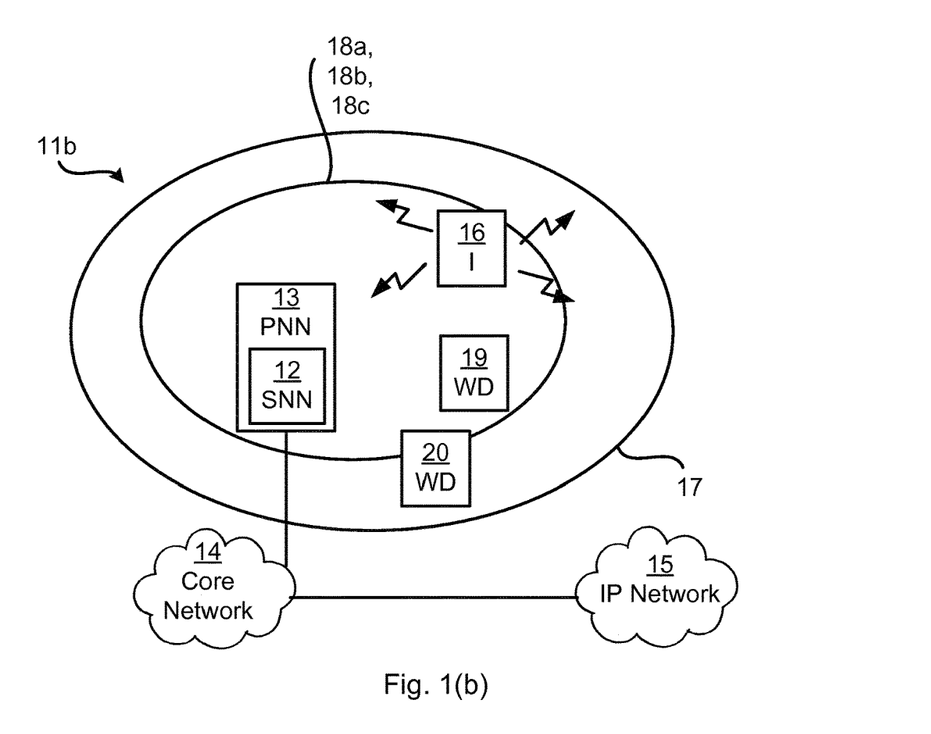

FIGS. 1a and 113 are schematic diagrams illustrating communication networks 11a, 11b where embodiments presented herein can be applied. The communication networks 11a, 11b are carrier aggregation enabled communications network. In general terms, carrier aggregation is used in LTE-Advanced in order to increase the bandwidth, and thereby increase the bitrate. The aggregation is based on carriers defined in Release 8 and Release 9 to keep backward compatibility with R8 and R9 compatible legacy wireless devices 20. Carrier aggregation can be used for both frequency-division duplexing (FDD) and time-division duplexing (TDD).

The communications networks 11a, 11b comprise a secondary network node (SNN) 12. The secondary network node 12 is a secondary cellular network node. The secondary cellular network node 12 may be a Node B or an Evolved Node B. The secondary cellular network node 12 provides network coverage to a carrier aggregation capable wireless device 19 in at least one secondary serving cell (SCell) 18a, in, 18c. The communications networks 11a, 11b further comprise a primary network node (PNN) 13. The primary network node 13 is a primary cellular network node. The primary cellular network node 13 may be a Node B or an Evolved Node B. The primary cellular network node 13 provides network coverage to the wireless device 19 as well as the wireless device 20 in a primary serving cell (PCell) 17. The SCell 18a, 18b, 18c is a secondary serving cell associated with the PCell 17 for the wireless device 19.

An interferer (I) 16 is also present in the communication networks 11a, 11b. The interferer 16 may be a radio transmitter transmitting in a frequency band, such as an unlicensed frequency band.

An arrangement may comprise a secondary cellular network node 12 and a primary cellular network node 13. In the communication networks 11a of FIG. 1a the primary cellular network node 13 and the secondary cellular network node 12 are provided as separated devices. In the communication networks 11b of FIG. 1b the primary cellular network node 13 comprises the secondary cellular network node 12. The secondary cellular network node 12 may thus be a part of the primary cellular network node 13.

The embodiments disclosed herein are based on configuring the SCell, for example in an LTE Carrier Aggregation (CA) scenario, assuming the SCell is deployed in an unlicensed spectrum, such as the ISM band. The embodiments for example address the coexistence with other RATs, such as Wi-Fi, than used by the PCell and the SCell, by making use of the fact that the bandwidth of the SCell can be adjusted. Specifically, after estimating where there are interfering signals, the largest consecutive frequency range with non (or low)-interfering signals may be identified and then the bandwidth of the signal in the SCell may be chosen such that it will reduce the likelihood of interference to other RATs as well as the reducing the likelihood to be interfered by the other RATs. The embodiments disclosed herein particularly relate to configuration of a secondary cellular network node 12. In order to obtain configuration of the secondary cellular network node 12 there is provided a secondary cellular network node, a method performed by the secondary cellular network node, a computer program comprising code, for example in the form of a computer program product, that when run on the secondary cellular network node causes the secondary cellular network node to perform the method.

In order to obtain configuration of a secondary cellular network node 12 there is further provided a primary cellular network node 13, a method performed by the primary cellular network node 13, a computer program comprising code, for example in the form of a computer program product, that when run on the primary cellular network node 13, causes the primary cellular network node 13 to perform the method.

Figure 2A:
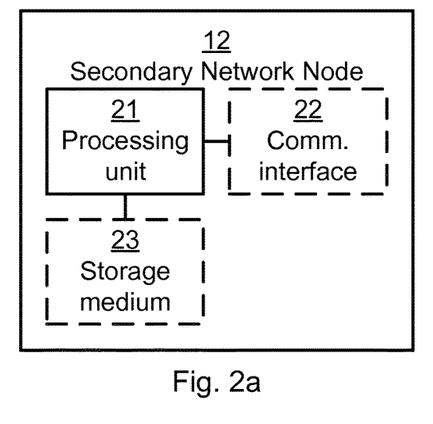
FIG. 2a is a schematic diagram showing functional modules of a secondary network node according to an embodiment.

FIG. 2a schematically illustrates, in terms of a number of functional modules, the components of a secondary cellular network node 12 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 4), e.g. in the form of a storage medium 23. Thus the processing unit 21 is thereby arranged to execute methods as herein disclosed. The a storage medium 23 may also comprise persistent storage, which, for example, can be any single one or combination of magnetic memory, optical memory, solid state memory or even remotely mounted memory. The secondary cellular network node 12 may further comprise a communications interface 22 for communications with a primary cellular network node 13, a wireless device 19, and (optionally) a legacy wireless device 20. As such the communications interface 22 may comprise one or more transmitters and receivers, comprising analogue and digital components and a suitable number of antennas for radio communications and/or interfaces for wired communication.

The processing unit 21 controls the general operation of the secondary cellular network node 12 e.g. by sending data and control signals to the communications interface 22 and the storage medium 23, by receiving data and reports from the communications interface 22, and by retrieving data and instructions from the storage medium 23. Other components, as well as the related functionality, of the secondary cellular network node 12 are omitted in order not to obscure the concepts presented herein.

Figure 2B:
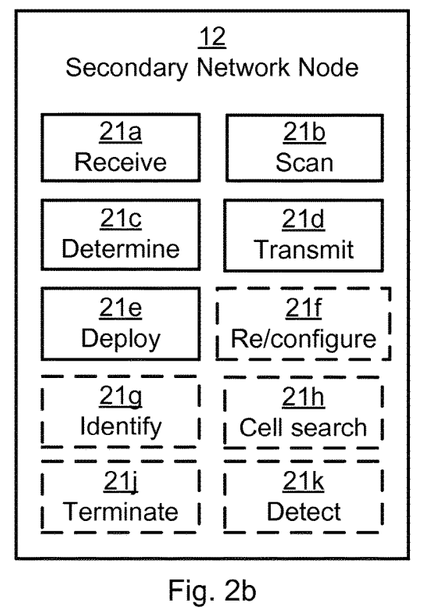
FIG. 2b is a schematic diagram showing functional units of a secondary network node according to an embodiment.

FIG. 2b schematically illustrates, in terms of a number of functional units, the components of a secondary cellular network node 12 according to an embodiment. The secondary cellular network node 12 of FIG. 2b comprises a number of functional units; a receive unit 21a, a scan unit 21b, a determine unit 21c, a transmit unit 21d, and a configure unit 21e. The secondary cellular network node 12 of FIG. 2b may further comprises a number of optional functional units, such as any of a identify 21f, a cell search unit 21g, a reconfigure unit 21h, a terminate unit 21j, and a detect unit 21k. The functionality of each functional unit 21a-k will be further disclosed below in the context of which the functional units may be used. In general terms, each functional unit 21a-k may be implemented in hardware or in software. The processing unit 21 may thus be arranged to from the storage medium 23 fetch instructions as provided by a functional unit 21a-k and to execute these instructions, thereby performing any steps as will be disclosed hereinafter.

Figure 3A:
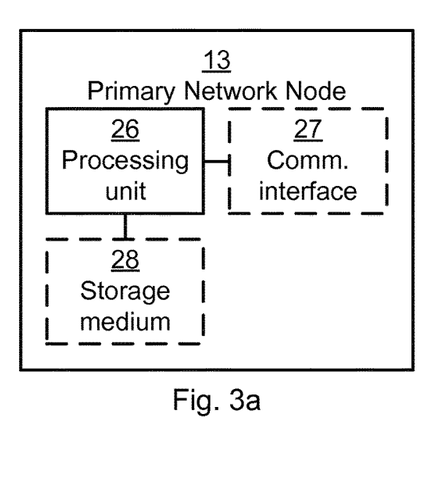
FIG. 3a is a schematic diagram showing functional modules of a primary network node according to an embodiment.

FIG. 3a schematically illustrates, in terms of a number of functional modules, the components of a primary cellular network node 13 according to an embodiment. A processing unit 26 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 4), e.g. in the form of a storage medium 28. Thus the processing unit 26 is thereby arranged to execute methods as herein disclosed. The a storage medium 28 may also comprise persistent storage, which, for example, can be any single one or combination of magnetic memory, optical memory, solid state memory or even remotely mounted memory. The primary cellular network node 13 may further comprise a communications interface 27 for communications with an access point 12, a wireless device 19, a legacy wireless device 20, and a core network 14. As such the communications interface 27 may comprise one or more transmitters and receivers, comprising analogue and digital components and a suitable number of antennas for radio communications and interfaces for wired communication. The processing unit 26 controls the general operation of the primary cellular network node 13 e.g. by sending data and control signals to the communications interface 27 and the storage medium 28, by receiving data and reports from the communications interface 27, and by retrieving data and instructions from the storage medium 28. Other components, as well as the related functionality, of the primary cellular network node 13 are omitted in order not to obscure the concepts presented herein.

Figure 3B:
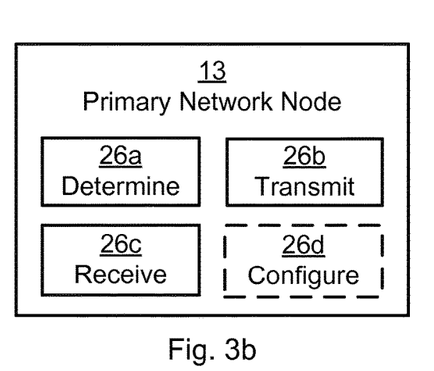
FIG. 3b is a schematic diagram showing functional units of a primary network node according to an embodiment.

FIG. 3b schematically illustrates, in terms of a number of functional units, the components of a primary cellular network node 13 according to an embodiment. The primary cellular network node 13 of FIG. 2b comprises a number of functional units; a determine unit 26a, a transmit unit 26b, and a receive unit 26c. The primary cellular network node 13 of FIG. 2b may further comprises a number of optional functional units, such as a configure unit 26d. The functionality of each functional unit 26a-d will be further disclosed below in the context of which the functional units may be used. In general terms, each functional unit 26a-d may be implemented in hardware or in software. The processing unit 25 may thus be arranged to from the storage medium 28 fetch instructions as provided by a functional unit 26a-d and to execute these instructions, thereby performing any steps as will be disclosed hereinafter.

Figure 4:
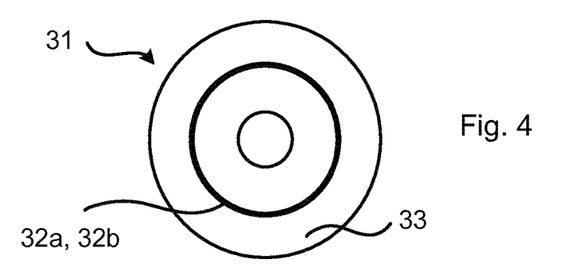
FIG. 4 shows one example of a computer program product comprising computer readable means according to an embodiment.
Figure 5A:
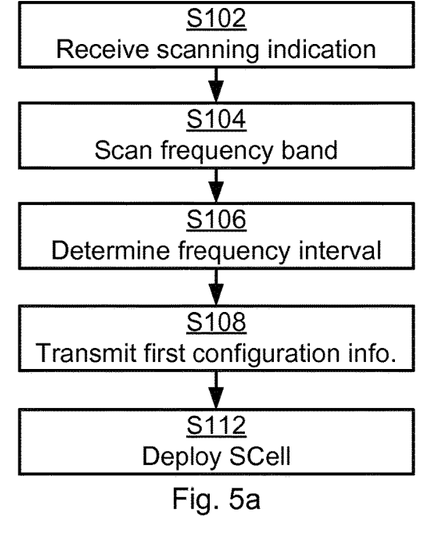
FIGS. 5a, 5b, 6a, and 6b are flowcharts of methods according to embodiments.
Figure 5B:
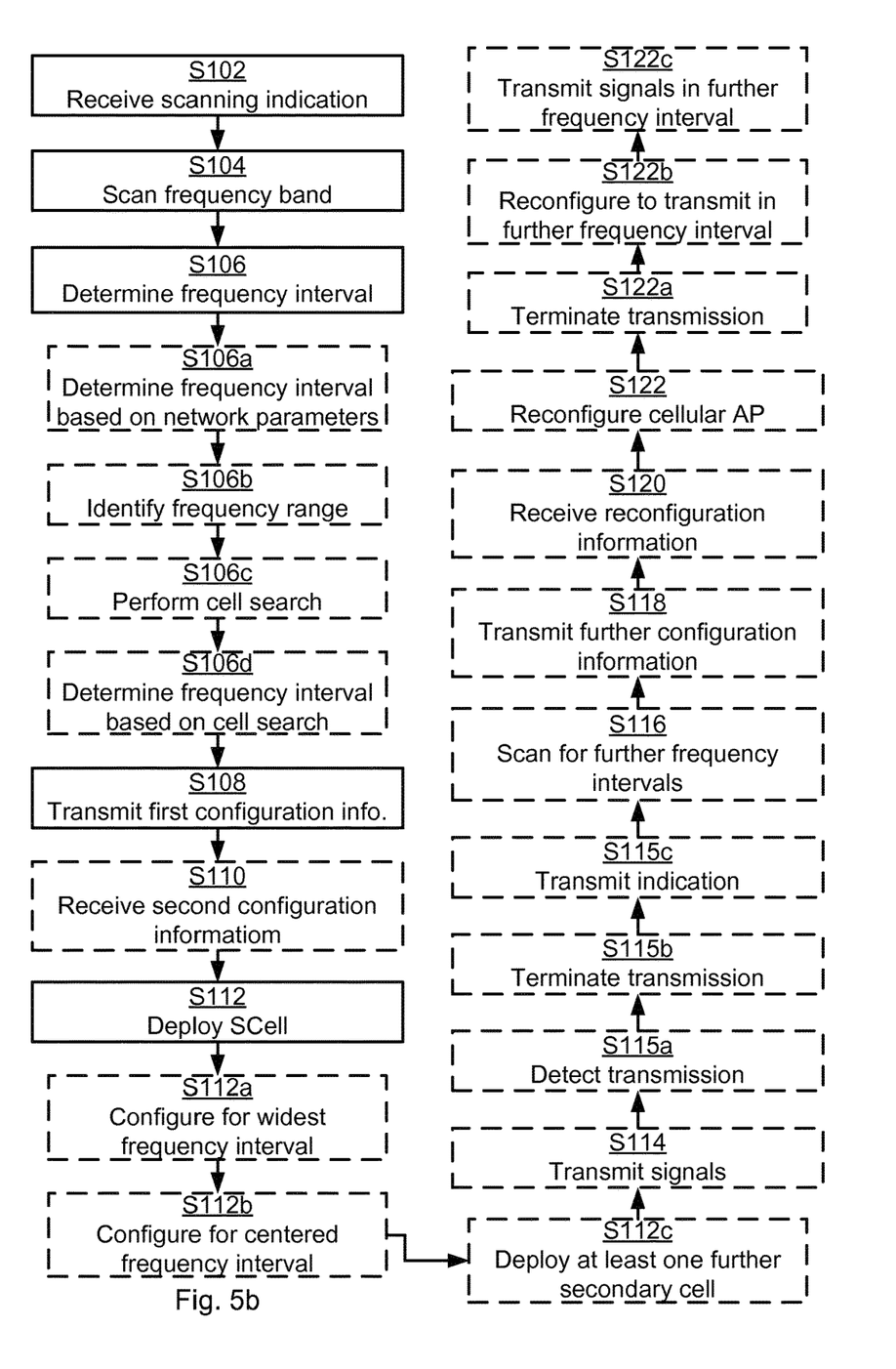
Figure 6A:
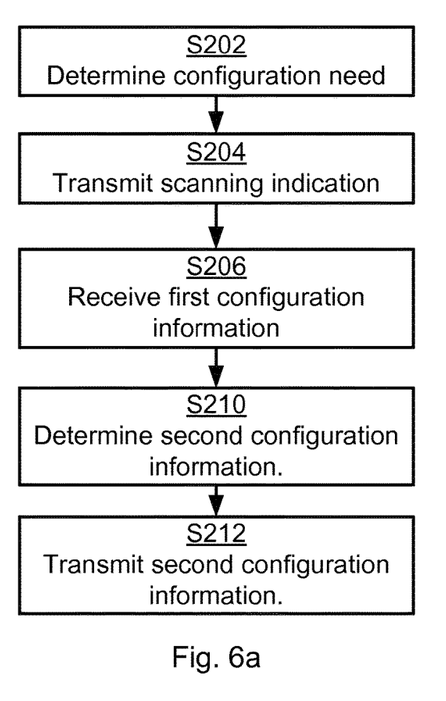
Figure 6B:
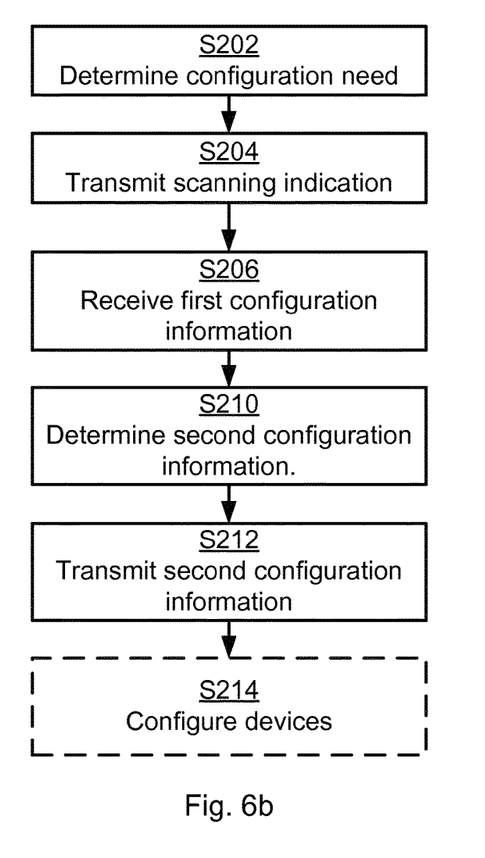

FIGS. 5a and 5b are flow chart illustrating embodiments of methods for configuration of a secondary cellular network node as performed by the secondary cellular network node 12. FIGS. 6a and 6b are flow chart illustrating embodiments of methods for configuration of a secondary cellular network node as performed by the primary cellular network node 13. The methods are advantageously provided as computer programs 32a, 32b. FIG. 4 shows one example of a computer program product 31 comprising computer readable means 33. On this computer readable means 33, computer programs 32a, 32b can be stored, which computer program 32a can cause the processing unit 21 and thereto operatively coupled entities and devices, such as the communications interface 22 and the storage medium 23 to execute methods according to embodiments described herein, and which computer program 32b can cause the processing unit 26 and thereto operatively coupled entities and devices, such as the communications interface 27 and the storage medium 28 to execute methods according to embodiments described herein. The computer programs 32a, 32b and/or computer program product 31 may thus provide means for performing any steps as herein disclosed.

In the example of FIG. 4, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 32a, 32b are here schematically shown as a track on the depicted optical disk, the computer programs 32a, 32b can be stored in any way which is suitable for the computer program product 31.

In the following, deploying a secondary serving cell 18a, 18b, 18c is to be understood as being short for deploying the secondary cellular network node 12 to serve the secondary serving cell 18a, 18b, 18c.

Reference is now made to FIG. 5a illustrating a method for configuration of a secondary cellular network node 12 according to an embodiment as performed by the secondary cellular network node 12. The secondary cellular network node 12 is arranged to serve a secondary serving cell (SCell) 18a associated with a primary serving cell (PCell) 17 in a carrier aggregation enabled communications network 11a, 11b.

The processing unit 21 of the secondary cellular network node 12 is arranged to, in a step S102, receive an indication from a primary cellular network node 13 associated with the PCell 17 to start scanning an unlicensed frequency band for deployment of the SCell 18a. The indication may have been transmitted from the primary cellular network node 13 as in step S204, see FIG. 6a below.

In response to this indication the secondary cellular network node 12 scans the unlicensed frequency band. Hence the processing unit 21 of the secondary cellular network node 12 is arranged to, in a step S104, scan at least one unlicensed frequency band. The processing unit 21 of the secondary cellular network node 12 is thereby arranged to determine whether or not interference from transmitting interferers 16 is present in the at least one unlicensed frequency band.

The secondary cellular network node 12 then, based on the result of the scanning, determines a frequency interval band in the unlicensed frequency band, which frequency interval band is free from transmitting interferers 16.

Figure 7:
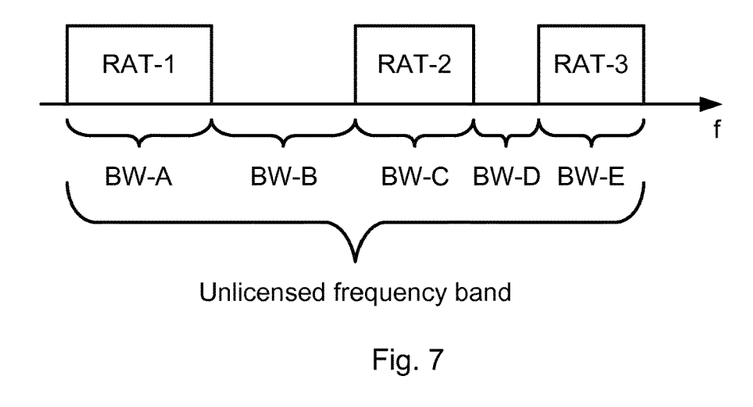
FIGS. 7, 8a, 8b, 9a, and 9b schematically illustrate frequency allocation according to embodiments.

The processing unit 21 of the secondary cellular network node 12 is thus arranged to, in a step S106, determine, based on the scanning, at least one frequency interval of the at least one unlicensed frequency band substantially free from the transmitting interferers 16. In FIG. 7 RAT-1, RAT-2, and RAT-3 represent examples of transmitting interferers. In FIG. 7 the frequency intervals free from the transmitting interferers 16 thus are BW-B and BW-D.

The secondary cellular network node 12 then, based on the determined frequency interval band, transmits first configuration information to the primary cellular network node 13. Examples of first configuration information will be provided below. Particularly, the processing unit 21 of the secondary cellular network node 12 is arranged to, in a step S108, transmit first configuration information of the at least one frequency interval to the primary cellular network node 13. This first configuration information may be received by the primary cellular network node 13 as in step S206, see FIG. 6a below.

The SCell 18a may then be deployed by the secondary cellular network node 12. The processing unit 21 of the secondary cellular network node 12 is thus arranged to, in a step S112, deploy the SCell 18a. The SCell 18a is deployed by the secondary cellular network node 12 being configured for transmission in one of the at least one frequency interval according to second configuration information. The second configuration information is based on the first configuration information.

The secondary cellular network node 12 may thusly be configured.

Reference is now made to FIG. 6a illustrating a method for configuration of a secondary cellular network node 12 according to an embodiment as performed by the primary cellular network node 13. The secondary cellular network node 12 is arranged to serve a secondary serving cell (SCell) 18a associated with a primary serving cell (PCell) 17 in a carrier aggregation enabled communications network 11a, 11b. The primary cellular network node 13 is associated with the PCell 17.

The primary cellular network node 13 first determines a need for configuration of the secondary cellular network node 12. The processing unit 26 of the primary cellular network node 13 is thus arranged to, in a step S202, determine a need for configuration of the secondary cellular network node 12 for the SCell 18a in an unlicensed frequency band. The need may, for example, relate to resource sharing and/or allocation, spectrum sharing and/or allocation, carrier aggregation, etc.

Once the need has been determined, an indication is transmitted to the secondary cellular network node 12. The processing unit 26 of the primary cellular network node 13 is arranged to, in a step S204, transmit an indication for the secondary cellular network node 12 to start scanning the unlicensed frequency band for deployment of the SCell. This indication may be received by the secondary cellular network node 12 as in step S102 above.

The secondary cellular network node 12 may then perform steps S104, S106, and S108 as disclosed above. The processing unit 26 of the primary cellular network node 13 is therefore arranged to, in a step S206, receive, from the secondary cellular network node 12, first configuration information of at least one frequency interval of the at least one unlicensed frequency band substantially free from transmitting interferers 16.

The primary cellular network node 13 then determines whether to enable an SCell in the unlicensed frequency band or not. If the decision is to enable an SCell, the primary cellular network node 13 sends configuration parameters. These may be the same as the secondary cellular network node 12 reported, but may also be different. The primary cellular network node 13 thus, based on the received first configuration information determines second configuration information. The processing unit 26 of the primary cellular network node 13 is arranged to, in a step S210, determine, based on the received first configuration information, second configuration information for configuring the secondary cellular network node 12 for transmission in one of the at least one frequency interval.

The determined second configuration information is then communicated to the secondary cellular network node 12. The processing unit 26 of the primary cellular network node 13 is thus arranged to, in a step S212, transmit the second configuration information to the secondary cellular network node 12. This second configuration information may be received by the secondary cellular network node 12 as in step S110 below.

The primary cellular network node 13 may thusly configure the secondary cellular network node 12.

Embodiments relating to further details of configuration of the secondary cellular network node 12 will now be disclosed.

The first configuration information and the second configuration information may be identical. In a case the first configuration information and the second configuration information are identical the second configuration information may in step S212 be transmitted as an Acknowledgement message. Alternatively the second configuration information is a modification of the first configuration information.

The second configuration information may comprise bandwidth configuration information, carrier frequency configuration information, radio channel number information, and/or transmission power configuration information.

The unlicensed frequency band may be an Industrial, Science, Medical, ISM, radio band. Particularly, the at least one unlicensed frequency band may be at least one of a 900 MHz frequency band, a 2.4 GHz frequency band, a 5 GHz frequency band, a 24 GHz frequency band or a 60 GHz frequency band. The unlicensed frequency band may further be defined by other unlicensed non-ISM frequency bands.

Reference is now made to FIGS. 5b and 6b illustrating methods for configuration of a secondary cellular network node according to further embodiments.

There may be different ways for the secondary cellular network node 12 to scan the at least one unlicensed frequency band (as in step S104). According to an embodiment the scanning in step S104 comprises at least one of performing a power scan in the at least one unlicensed frequency band, and performing a cell search in the at least one unlicensed frequency band.

There may be different ways to determine in which one of the at least one frequency interval the SCell 18a is to be deployed. Different embodiments relating thereto will now be described in turn.

For example, the frequency interval may be determined based on network parameters. According to one embodiment the processing unit 21 of the secondary cellular network node 12 is thus arranged to, in an optional step S106a, determine the one of the at least one frequency interval based on at least one of ACLR, requirements, ACS, requirements, bandwidth requirements, and throughput requirements for the SCell 18a.

For example, the frequency interval may be determined based on signal strength parameters. According to another embodiment the processing unit 21 of the secondary cellular network node 12 is thus arranged to determine the at least one frequency interval by, in an optional step S106b, identify a frequency range where a received signal strength indicator (RSSI) is below a predetermined threshold.

For example, the frequency interval may be determined based on a cell search. According to yet another embodiment the processing unit 21 of the secondary cellular network node 12 is arranged thus to determine the at least one frequency interval by, in an optional step S106c, perform a cell search to detect at least one free frequency interval. The free frequency interval is substantially free from transmission from an interfering radio access technology (RAT) source 16. The at least one frequency interval may then be determined, in an optional step S106d, based on the at least one free frequency interval.

According to an embodiment the processing unit 21 of the secondary cellular network node 12 is arranged to, in an optional step S110, receive the second configuration information from the primary cellular network node 12 prior to performing the configuring in step S112. The second configuration information may be transmitted by the primary cellular network node 12 as in step S212.

For example, suppose that it is desired to deploy an SCell in the 2.4 GHz ISM frequency band, located between 2.4 and 2.4835 GHz, or in the 5 GHz ISM band, located between 5.15 and 5.725 GHz. In order not to severely degrade the performance of any other communications system currently using this frequency band, a scan (as in step S104) may first be made to determine what other radio access technologies (RATs) are present and also what parts of this frequency band that is occupied.

For example, the SCell 18a may be deployed in the widest available frequency interval. According to one embodiment the processing unit 21 of the secondary cellular network node 12 is thus arranged to, in an optional step S112a, configure the secondary cellular network node 12 for transmission in a widest of the at least one frequency interval. There may be different reasons for deploying the SCell 18a in the widest available frequency interval. For example, this may allow for SCell 18a to use a wider bandwidth. For example, even if there are several parts of the frequency band which would allow for the widest bandwidth to be used, it may allow for a larger guard band to other RATs currently operating in the ISM band.

For example, the SCell 18a may be deployed with a carrier frequency centered in an available frequency interval. According to one embodiment the processing unit 21 of the secondary cellular network node 12 is thus arranged to, in an optional step S112b, configure the secondary cellular network node 12 for transmission in a bandwidth interval being centered in the one of said at least one frequency interval.

According to a further example, steps S112a and S112b may be combined, thus resulting in the SCell 18a being deployed with a carrier frequency centered in the widest available frequency interval After having performed the scanning (as in step S104), the secondary cellular network node 12 may compare the bandwidth which can be used by the SCell 18a without interfering with RATs of other communications systems with a threshold so as to determine to run the SCell 18a in the unlicensed band only if the available bandwidth is larger than this threshold. For example, suppose that the SCell 18a is enabled to use a bandwidth of either 1.4 MHz, 5 MHz, 10 MHz, or 20 MHz. It may have been determined that at least 10 MHz is needed for the deployed SCell 18a. Thus if the scan in S104 indicates that only 8 MHz is available, it is determined to not run the SCell 18a. On the other hand, if the threshold would be such that the SCell 18a should be run if at least 5 MHz is available, it may be determine for the SCell 18a to start operating in the frequency band, and hence to configure the secondary cellular network node 12 accordingly in step S112.

The secondary cellular network node 12 may deploy more than one SCell. That is, the secondary cellular network node 12 may deploy two or more SCells. According to an embodiment the processing unit 21 of the secondary cellular network node 12 is thus arranged to, in an optional step S112c, deploy at least one further SCell 18b, 18c of the PCell. The at least one further SCell 18b, 18c is deployed by configuring the secondary cellular network node for further transmission in the one of the at least one frequency interval or in another of said at least one frequency interval according to further configuration information. That is, the at least one further SCell 18b, 18c may be deployed in either the same frequency interval as the SCell 18a or in another frequency interval than the SCell 18a.

Once the one or more SCells 18a, 18b, 18c have been deployed the secondary cellular network node 12 may start transmitting signals. Thus, according to an embodiment the processing unit 21 of the secondary cellular network node 12 is arranged to, in an optional step S114, transmit signals in the SCell 18a, 18b, 18c according to the second configuration information. There may be different examples of signals for the secondary cellular network node 12 to transmit in the SCell 18a, 18b, 18c. Examples of signals transmitted include, but are not limited to: any combination of synchronization signals (such as primary and secondary synchronization signals, PSS/SSS), pilot signals (such as a common reference signal or a dedicated reference signals), beacon signals (such as an LTE beacon signal), and broadcast information signals (such as a master information block and a system information block, MIB/SIB). The transmitted signals may be transmitted using CSMA/CA.

Further, the secondary cellular network node 12 may detect interference from transmitting interferers 16 in the one of the at least one frequency interval. According to an embodiment the processing unit 21 of the secondary cellular network node 12 is thus arranged to, in an optional step S115a, detect transmission of interference from transmitting interferers 16 in the one of the at least one frequency interval. There may be different ways of handling such situations. For example, the secondary cellular network node 12 may, in an optional step S115b, terminate transmission of the signals (as transmitted in step S114) in the SCell 18a according to the second configuration information. The secondary cellular network node 12 may then, in an optional step S115c, transmit an indication thereof to the primary cellular network node 13. The primary cellular network node 13 is thereby made aware of an interferer 16 being present in the frequency interval used by the SCell 18a. The primary cellular network node 13 may then take appropriate actions. One such action may involve reconfiguration of the AP 12 similar to step S122, see below.

The secondary cellular network node 12 may continue to scan, for example upon order for the primary cellular network node 13, for other activities in the unlicensed frequency band. For example, the primary cellular network node 13 may instruct the secondary cellular network node 12 to continue the scanning, and report if a better SCell setup may be possible. According to an embodiment the processing unit 21 of the secondary cellular network node 12 is thus arranged to, in an optional step S116, scan the at least one unlicensed frequency band for further frequency intervals substantially free from the transmitting interferers 16. This could provide an indication that some new network activities (by other RATs in the unlicensed frequency band) start or that some of the ongoing network activities stop operation.

For example, the secondary cellular network node 12 may report to the primary cellular network node 13 a need for reconfiguration (for example to change the bandwidth or carrier frequency). At least one further frequency interval free from the transmitting interferers may be detected. According to an embodiment the processing unit 21 of the secondary cellular network node 12 is arranged to, in an optional step S118, transmit further configuration information about the at least one further frequency interval to the primary cellular network node 13. The primary cellular network node 13 may then determine reconfiguration confirmation about the at least one further frequency interval and transmit this reconfiguration confirmation to the secondary cellular network node 12. According to this embodiment the processing unit 21 of the secondary cellular network node 12 is thus arranged to, in an optional step S120, receive reconfiguration confirmation from the primary cellular network node 13. The secondary cellular network node 12 may then, in an optional step S122, be reconfigured for transmission in one of the at least one further frequency interval according to the reconfiguration information.

There may be different ways to perform the reconfiguration in step S122. For example, the processing unit 21 of the secondary cellular network node 12 may be arranged to, in an optional step S122a, terminate transmission of the signals (for example as transmitted in step S114) in the SCell 18a, as transmitted according to the second configuration information. The secondary cellular network node 12 may then, in an optional step S122b, be reconfigured to transmit the signals in one of the at least one further frequency interval. The secondary cellular network node 12 may then, in an optional step S122c, transmit the signals in the SCell 18a according to the reconfiguration information.

There may be different ways to determine if the secondary cellular network node 12 is to be reconfigured. Examples include, but are not limited to, situations where the at least one further frequency interval free from the transmitting interferers 16 has better adjacent channel leakage ratio (ACLR) properties, adjacent channel selectivity (ACS) properties, bandwidth properties, and/or throughput than the one of the at least one frequency interval.

The primary cellular network node 13 may configures connected devices 19 with information of the SCell 18a in order for the connected devices 19 to be able to utilize carrier aggregation. According to an embodiment the processing unit 26 of the primary cellular network node 13 is thus arranged to, in an optional step S214, configure devices 19 operatively connected to the primary cellular network node 13 according to the second configuration information. The configuration information transmitted to the devices 19 may be the same as the second configuration information, a proper subset of the second configuration information, or may be information that is associated with the second configuration information.

FIG. 7 schematically illustrates one example of frequency allocation in an unlicensed frequency band. The unlicensed frequency band in FIG. 7 is occupied by a first RAT (denoted RAT-1) operating in a bandwidth BW-A, by a second RAT (denoted RAT-2) operating in a bandwidth BW-C, and by a third RAT (denoted RAT-3) operating in a bandwidth BW-E. The bandwidths BW-B and BW-D are free of use. Two or more of RAT-1, RAT-2 and RAT-3 may be the same RAT but operating in different frequency intervals.

Figure 8:
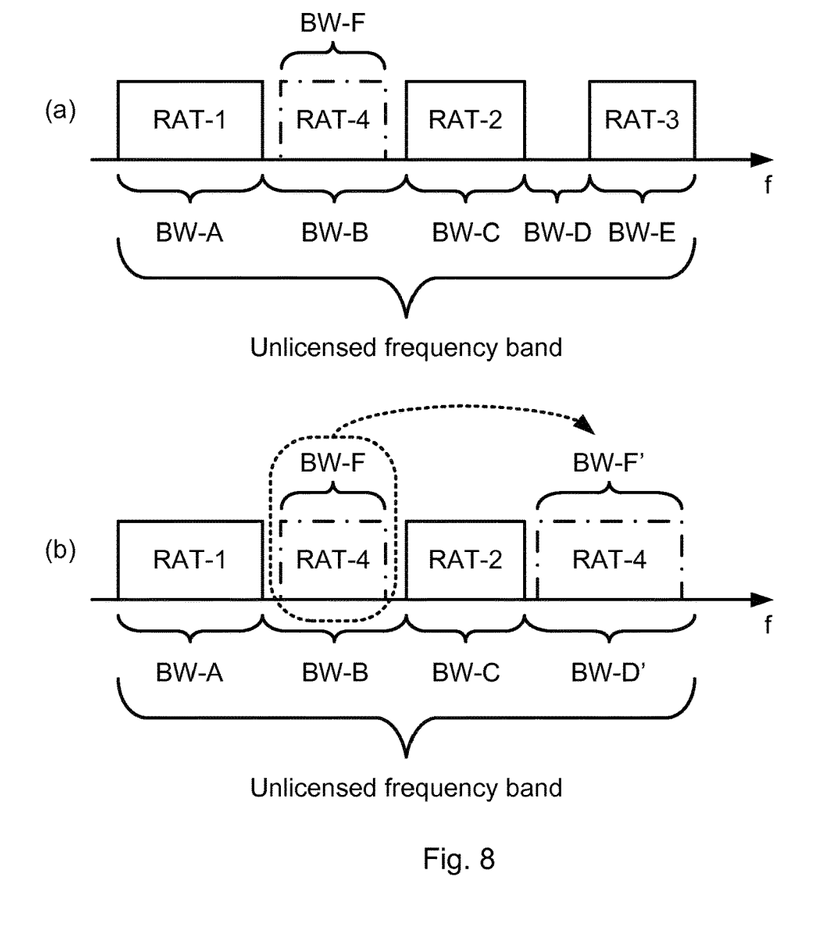

FIG. 8(a) schematically illustrates one example of frequency allocation in an unlicensed frequency band similar to that of FIG. 7. In comparison to FIG. 7, a fourth RAT (denoted RAT-4) now occupies a bandwidth BW-F which is part of BW-B. RAT-4 represents the bandwidth of the deployed SCell 18a.

FIG. 8(b) schematically illustrates one example of frequency allocation in an unlicensed frequency band similar to that of FIG. 8(a). In comparison to FIG. 8(a), RAT-3 has terminated it transmission and reception in BW-E, thus expanding BW-D to BW-D', allowing RAT-4 to be moved from the bandwidth interval BW-B to the bandwidth interval BW-D' and to occupy a bandwidth BW-F', where BWF' is wider than BW-F.

Figure 9:
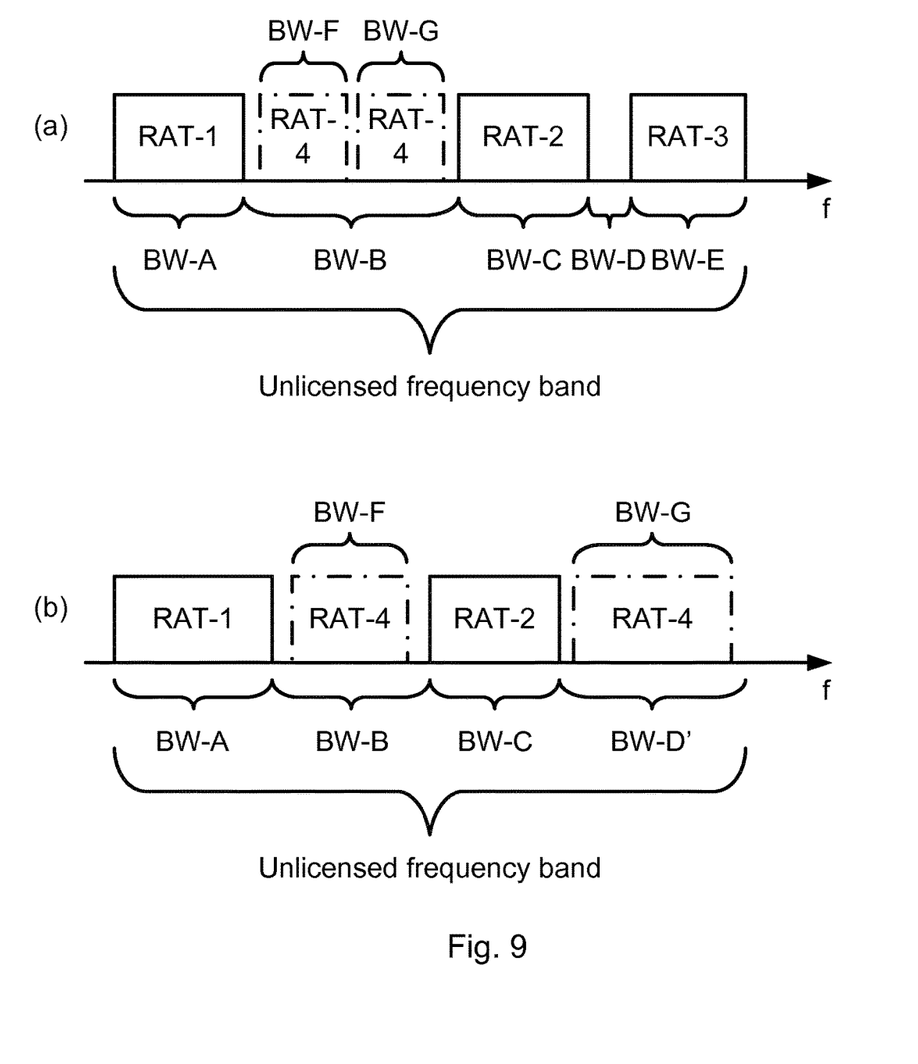

FIGS. 9(a) and 9(b) schematically illustrate two further examples of frequency allocation in an unlicensed frequency band similar to that of FIG. 8(a). In FIG. 9(a) RAT-4 occupies a first part (denoted BW-F) and a second part (denoted BW-G) of the bandwidth interval BW-B, thus enabling the secondary cellular network node 12 to deploy a first SCell 18a using BW-F and a second SCell using BW-G. In FIG. 9(b) RAT-4 also occupies a BW-F and BW-G for deploying SCell 18a and SCell 18b, respectively, but in comparison to FIG. 9(a) BW-F and BW-G are located in disjoint frequency intervals (BW-B and BW-D', respectively).

Two particular embodiments of configuration of a secondary cellular network node 12 will now be disclosed. Both particular embodiments assume that a PCell is operating in a licensed band and a need for carrier aggregation (enabling and configuration) of an SCell in an unlicensed band is needed.

The first particular embodiment relates to operations of the primary cellular network node 13. The primary cellular network node 13 determines a need for configuration of the secondary cellular network node (as in step S202). The primary cellular network node 13 orders scanning of an SCell to be performed by the secondary cellular network node 12 (as in step S204). The scanning parameters may be proposed carrier frequency and proposed SCell system bandwidth. The scanning parameters may further comprise auxiliary parameters, such as the type of adjacent (or co-channel) interferers (such as another SCell, or Wi-Fi, etc.), distance (in frequency) to the closest adjacent interferer 16, and/or adjacent/co-channel interference level. Based on first configuration information as received from the secondary cellular network node 12 (as in step S206) the primary cellular network node 13 determines either to configure an SCell or not (as in step S210). If no configuration, the primary cellular network node 13 may inform the secondary cellular network node 12 to continue the SCell scanning. If there is a decision to configure an SCell the primary cellular network node 13 informs the secondary cellular network node 12 with determined SCell parameters defining second configuration information (as in step S212). The parameters of the second configuration information may be the same as proposed by the secondary cellular network node 12 (i.e., the same as the first configuration information), but may also be different (such as a change or reduce of system bandwidth for the SCell, or change of carrier frequency (or radio channel number to use) etc.). The second configuration information may further comprise information about max transmission power in the SCell, etc. The primary cellular network node 13 also configures connected devices for SCell carrier aggregation (as in step S14).

The second particular embodiment relates to operations of the secondary cellular network node 12.

The secondary cellular network node 12 receives an SCell scanning order from the primary cellular network node (as in step S102). The secondary cellular network node 12 scans an unlicensed frequency band or bands (as in step S104). The secondary cellular network node 12 determines first configuration information (as in step S106), which may comprise the best suitable SCell carrier frequency (or radio channel number) and system bandwidth, and reports this to the primary cellular network node (as in step S108). The secondary cellular network node 12 may then receive the second configuration information (as in step S108) to use by the secondary cellular network node 12, and configures the AP to operate (as in step S110). The operation may include continuous transmission (i.e., transmission every sub frame or regular according to known SCell handling, such as known LTE SCell handling), or discontinuous transmission of synchronization signals (such as PSS/SSS) and pilot signals (such as CRS). In the discontinuous transmission case, the transmission may only be done upon configured (by the primary cellular network node 13) transmission of data (then Dedicated Modulation Reference Signals (DMRS) are transmitted) on the SCell.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuration of a secondary cellular network node for a secondary serving cell associated with a primary serving cell in a carrier aggregation enabled communications network, the method being performed by the secondary cellular network node and comprising the steps of:
   receiving an indication from a primary cellular network node associated with the primary serving cell to start scanning an unlicensed frequency band for deployment of the secondary serving cell, wherein the indication is received when the primary cellular network node determines a need for configuration of the secondary cellular network node for the secondary serving cell in the unlicensed frequency band;
   scanning at least one unlicensed frequency band to determine whether or not interference from transmitting interferers is present in the at least one unlicensed frequency band, wherein parameters for scanning comprises carrier frequency and secondary serving cell bandwidth as recommended by the primary cellular network node;
   determining, based on said scanning, at least one frequency interval of said at least one unlicensed frequency band free from said transmitting interferers, wherein said at least one unlicensed frequency interval of said at least one unlicensed frequency band is determined based on at least one of adjacent channel leakage ratio, ACLR, requirements, adjacent channel selectivity, ACS, requirements, bandwidth requirements, and throughput requirements for the secondary serving cell;
   transmitting first configuration information of said at least one frequency interval to said primary cellular network node;
   deploying the secondary serving cell by configuring the secondary cellular network node for transmission in one of said at least one frequency interval according to a second configuration information being received from said primary cellular network node prior to performing said configuring and is based on said first configuration information, wherein the secondary cellular network node is configured for transmission in a widest of said at least one frequency interval;
   transmitting signals in the secondary serving cell according to said second configuration information;
   detecting transmission of interference from transmitting interferers in said one of said at least one frequency interval;
   terminating transmission of said signals in the secondary serving cell according to said second configuration information; and
   transmitting an indication, indicating that the transmission of said signals in the secondary serving cell according to said second configuration information is terminated to said primary cellular network node.

2. The method according to claim 1, wherein configuring the secondary cellular network node comprises:
   configuring the secondary cellular network node for transmission in a bandwidth interval being centered in said one of said at least one frequency interval.

3. The method according to claim 1, wherein said second configuration information comprises at least one of: bandwidth configuration information, carrier frequency configuration information, radio channel number information, and transmission power configuration information.

4. The method according to claim 1, wherein said transmitted signals are any combination of synchronization signals, such as primary and secondary synchronization signals, pilot signals, such as a common or dedicated reference signal, beacon signals and broadcast information signals, such as a master information block and a system information block.

5. The method according to claim 1, wherein said transmitted signals are transmitted using carrier sense multiple access with collision avoidance, CSMA/CA.

6. The method according to claim 1, wherein said scanning comprises at least one of: performing a power scan in said at least one unlicensed frequency band, and performing a cell search in said at least one unlicensed frequency band.

7. The method according to claim 1, wherein said at least one frequency interval is determined by:
   identifying a frequency range where a received signal strength indicator, RSSI, is below a predetermined threshold.

8. The method according to claim 1, wherein said at least one frequency interval is determined by:
   performing a cell search to detect at least one free frequency interval, said free frequency interval being substantially free from transmission from an interfering radio access technology, RAT, source; and determining said at least one frequency interval based on said at least one free frequency interval.

9. The method according to claim 1, further comprising:
scanning said at least one unlicensed frequency band for further frequency intervals free from said transmitting interferers.

10. The method according to claim 9, further comprising, if at least one further frequency interval free from said transmitting interferers has been detected:
transmitting further configuration information about said at least one further frequency interval to said primary cellular network node;
receiving reconfiguration confirmation from said primary cellular network node; and
reconfiguring the secondary cellular network node for transmission in one of said at least one further frequency interval according to said reconfiguration information.

11. The method according to claim 10, wherein said reconfiguring comprises:
terminating transmission of said signals in the secondary serving cell according to said second configuration information;
reconfiguring the secondary cellular network node to transmit said signals in one of said at least one further frequency interval; and
transmitting said signals in the secondary serving cell according to said reconfiguration information.

12. The method according to claim 9, wherein said at least one further frequency interval free from said transmitting interferers has better adjacent channel leakage ratio, ACLR, properties, adjacent channel selectivity, ACS, properties, bandwidth properties, or throughput than said one of said at least one frequency interval.

13. The method according to claim 1, wherein the unlicensed frequency band is an Industrial, Science, Medical, ISM, radio band.

14. The method according to claim 1, wherein said at least one unlicensed frequency band is at least one of a 2.4 GHz frequency band, a 5 GHz frequency band, a 900 MHz frequency band, a 24 GHz frequency band or a 60 GHz frequency band.

15. The method according to claim 1, wherein the secondary cellular network node is a Node B or an Evolved Node B.

16. The method according to claim 1, further comprising:
deploying at least one further secondary cell of the primary serving cell by configuring the secondary cellular network node for further transmission in said one of said at least one frequency interval or in another of said at least one frequency interval according to further configuration information received from secondary cellular network node.

17. A secondary cellular network node for configuration of the secondary cellular network node for a secondary serving cell associated with a primary serving cell in a carrier aggregation enabled communications network, the secondary cellular network node comprising a processing unit arranged to:
receive an indication from a primary cellular network node associated with the primary serving cell to start scanning an unlicensed frequency band for deployment of the secondary serving cell, wherein the indication is received when the primary cellular network node determines a need for configuration of the secondary cellular network node for the secondary serving cell in the unlicensed frequency band;
scan at least one unlicensed frequency band to determine whether or not interference from transmitting interferers is present in the at least one unlicensed frequency band, wherein parameters for scanning comprises carrier frequency and secondary serving cell bandwidth as recommended by the primary cellular network node;
determine, based on said scanning, at least one frequency interval of said at least one unlicensed frequency band free from said transmitting interferers, wherein said at least one unlicensed frequency interval of said at least one unlicensed frequency band is determined based on at least one of adjacent channel leakage ratio, ACLR, requirements, adjacent channel selectivity, ACS, requirements, bandwidth requirements, and throughput requirements for the secondary serving cell;
transmit first configuration information of said at least one frequency interval to said primary cellular network node;
deploy the secondary serving cell by configuring the secondary cellular network node for transmission in one of said at least one frequency interval according to a second configuration information being received from said primary cellular network node prior to performing said configuring and is based on said first configuration information, wherein the secondary cellular network node is configured for transmission in a widest of said at least one frequency interval;
transmit signals in the secondary serving cell according to said second configuration information;
detect transmission of interference from transmitting interferers in said one of said at least one frequency interval;
terminate transmission of said signals in the secondary serving cell according to said second configuration information; and
transmit an indication, indicating that the transmission of said signals in the secondary serving cell according to said second configuration information is terminated to said primary cellular network node.

18. An arrangement comprising:
a secondary cellular network node according to claim 17; and
a primary cellular network node, wherein the primary cellular network node is for configuration of the secondary cellular network node for the secondary serving cell associated with the primary serving cell in the carrier aggregation enabled communications network, the primary cellular network node being arranged to be associated with the primary serving cell, and the primary cellular network node comprising a processing unit arranged to:
transmit an indication for the secondary cellular network node to start scanning the unlicensed frequency band for deployment of the secondary serving cell, wherein parameters for scanning comprises carrier frequency and secondary serving cell bandwidth as recommended by the primary cellular network node;
receive, from the secondary cellular network node, first configuration information, comprising adjacent channel interference level of at least one frequency interval of said at least one unlicensed frequency band;
determine, a need for re-configuration, based on said received adjacent channel interference level;
if there is a decision to re-configure, compiling a, second configuration information for configuring the secondary cellular network node for transmission in one of said at least one frequency interval; and transmit said second configuration information to the secondary cellular network node.

19. The arrangement according to claim 18, wherein the secondary cellular network node is part of the primary cellular network node.

\* \* \* \* \*